(12) United States Patent
Sigoure et al.

(10) Patent No.: US 9,866,409 B2
(45) Date of Patent: Jan. 9, 2018

(54) METHOD AND SYSTEM FOR VXLAN ENCAPSULATION OFFLOAD

(71) Applicant: Arista Networks, Inc., Santa Clara, CA (US)

(72) Inventors: Benoit Sigoure, San Francisco, CA (US); Kenneth James Duda, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 15/335,993

(22) Filed: Oct. 27, 2016

(65) Prior Publication Data

US 2017/0048084 A1 Feb. 16, 2017

Related U.S. Application Data

(62) Division of application No. 14/318,859, filed on Jun. 30, 2014, now Pat. No. 9,509,527.

(51) Int. Cl.
*H04L 12/56* (2006.01)
*H04L 12/46* (2006.01)
*H04L 12/931* (2013.01)

(52) U.S. Cl.
CPC ...... *H04L 12/4645* (2013.01); *H04L 12/4633* (2013.01); *H04L 12/4641* (2013.01); *H04L 49/354* (2013.01)

(58) Field of Classification Search
CPC ..................................................... H04L 12/934
USPC ......................................................... 370/392
See application file for complete search history.

(56) References Cited

U.S. PATENT DOCUMENTS

| | | | |
|---|---|---|---|
| 8,296,459 B1 | 10/2012 | Brandwine et al. |
| 2004/0162914 A1 | 8/2004 | St. Pierre et al. |
| 2012/0254353 A1 | 10/2012 | Baba et al. |
| 2012/0287936 A1 | 11/2012 | Biswas et al. |
| 2013/0124750 A1 | 5/2013 | Anumala et al. |
| 2015/0244617 A1 | 8/2015 | Nakil et al. |

OTHER PUBLICATIONS

M. Mahalingam et al., "VXLAN: A Framework for Overlaying Virtualized Layer 2 Networks over Layer 3 Networks", Apr. 10, 2014 (23 pages).
International Search Report issued in PCT/US2014/045183 dated Oct. 29, 2014 (5 pages).
Written Opinion issued in PCT/US2014/045183 dated Oct. 29, 2014 (8 pages).

*Primary Examiner* — Shripal Khajuria
(74) *Attorney, Agent, or Firm* — Chamberlain Hrdlicka

(57) ABSTRACT

A method for virtual extensible local area network (VXLAN) encapsulation. The method includes receiving a first augmented MAC frame on a first ingress port of a first network device, where the first augmented MAC frame includes a first egress port ID (EPID), a first ingress port ID (IPID), and a first MAC frame. The method further includes identifying a first destination VXLAN tunnel endpoint (VTEP) internet protocol (IP) address based on the first EPID, where the first destination VTEP IP address is associated with a first destination VTEP. The method further includes identifying a source VTEP IP address based on the first IPID, performing VXLAN encapsulation of the first MAC frame to obtain a VXLAN frame, and sending the VXLAN frame to the first destination VTEP via a first egress port of the first network device.

18 Claims, 11 Drawing Sheets

METHOD AND SYSTEM FOR VXLAN ENCAPSULATION OFFLOAD

CROSS-REFERENCE TO RELATED APPLICATIONS

Pursuant to 35 U.S.C. §120, this application is a divisional application of U.S. patent application Ser. No. 14/318,859, filed on Jun 30, 2014, and entitled "METHOD AND SYSTEM FOR VXLAN ENCAPSULATION OFFLOAD," which is herein incorporated by reference in its entirety.

BACKGROUND

Data centers typically include multiple network devices, such as hosts. The hosts, in turn, each execute multiple virtual machines. Based on the design of the data center and/or requirements of the applications executing on the virtual machines, data centers typically limit/restrict private connectivity between network devices or communication between the virtual machines to maintain security and performance of the data center. As a result, a given network device in the data center may not connect privately to another network device in the data center or a given virtual machine in the data center may not be able to communicate with (e.g., transmit packets to) another virtual machine in the data center.

SUMMARY

In general, in one aspect, the invention relates to a method for virtual extensible local area network (VXLAN) encapsulation. The method includes receiving a first augmented media access control (MAC) frame on a first ingress port of a first network device, wherein the first augmented MAC frame comprises a first egress port ID (EPID), a first ingress port ID (IPID), and a first MAC frame, identifying a first destination VXLAN tunnel endpoint (VTEP) internet protocol (IP) address based on the first EPID, wherein the first destination VTEP IP address is associated with a first destination VTEP, identifying a source VTEP IP address based on the first IPID, performing VXLAN encapsulation of the first MAC frame to obtain a VXLAN frame, wherein the first VXLAN frame comprises the source VTEP IP address, the first destination VTEP IP address and the first MAC frame, and sending the VXLAN frame to the first destination VTEP via a first egress port of the first network device.

In general, in one aspect, the invention relates to a system for virtual extensible local area network (VXLAN) encapsulation. The system includes a first network device, comprising a first processor, and configured to receive a first media access control (MAC) frame on a first ingress port of the first network device, wherein the first MAC frame comprises a destination host MAC address and a virtual local area network (VLAN) tag, determine a first ingress port ID (IPID) based on a switch chip ingress port connected to the first ingress port, identify a VXLAN network identifier (VNI) based on the VLAN tag, identify a first destination VXLAN tunnel endpoint (VTEP) based on the VNI, determine a first egress port ID (EPID) based on the first destination VTEP and the destination host MAC address, generate a first augmented MAC frame, wherein the first augmented MAC frame comprises the first IPID, the first EPID, the VNI, and the first MAC frame, and send the first augmented MAC frame to a second network device via a first egress port of the first network device. The system further includes the second network device, comprising a second processor and operatively connected to the first network device, and configured to receive the first augmented MAC frame on a second ingress port of the second network device, identify a first destination VTEP internet protocol (IP) address based on the first EPID, wherein the first destination VTEP IP address is associated with a first destination VTEP, identify a source VTEP IP address based on the first IPID, perform VXLAN encapsulation of the first MAC frame to obtain a VXLAN frame, wherein the VXLAN frame comprises the source VTEP IP address, the first destination VTEP IP address and the first MAC frame, and send the VXLAN frame to the first destination VTEP via a second egress port of the second network device.

In general, in one aspect, the invention relates to a system for virtual extensible local area network (VXLAN) decapsulation. The system includes a first network device, comprising a first processor, and configured to receive a VXLAN frame on a first ingress port of the first network device, wherein the VXLAN frame comprises a source VXLAN tunnel endpoint (VTEP) internet protocol (IP) address, a first destination VTEP IP address, a first VXLAN network identifier (VNI), and a first media access control (MAC) frame, identify a first ingress port ID (IPID) based on the source VTEP IP address, identify a first egress port ID (EPID) based on the first destination VTEP IP address, wherein the first destination VTEP IP address is associated with a first destination VTEP, determine that the first destination VTEP is located on the first network device, generate a first augmented MAC frame, wherein the first augmented MAC frame comprises the first IPID, the first EPID, the first VNI, and the first MAC frame, identify a first egress port on the first network device based on the first EPID, and send the first augmented MAC frame to a second network device via the first egress port on the first network device. The system further includes the second network device, comprising a second processor and operatively connected to the first network device, and configured to receive the first augmented MAC frame on a second ingress port of the second network device, wherein the second ingress port connects to the egress port on the first network device, and wherein the first MAC frame in the first augmented MAC frame comprises, a source host MAC address and a first destination host MAC address, learn the source host MAC address based on the first IPID, and forward the first MAC frame to a third network device based on the first destination host MAC address.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5C, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for virtual extensible local area network (VXLAN) encapsulation. More specifically, embodiments of the invention relate to offloading VXLAN encapsulation of a media access control (MAC) frame received on a leaf switch by sending an augmented MAC frame to a spine switch connected to the leaf switch. In one or more embodiments of the invention, the spine switch may then perform VXLAN encapsulation of the MAC frame. Embodiments of the invention further relate to offloading VXLAN decapsulation of a VXLAN frame to a spine switch that generates an augmented MAC frame to send to a leaf switch connected to the destination of the MAC frame.

In one or more embodiments of the invention, the tunneling mechanisms use, at least in part, the VXLAN protocol. One version of the VXLAN protocol is defined in the document entitled "VXLAN: A Framework for Overlaying Virtualized Layer 2 Networks over Layer 3 Networks" version 09 dated April 2014. The VXLAN protocol is hereby incorporated by reference in its entirety. The invention is not limited to a particular version of VXLAN.

Figure 1:
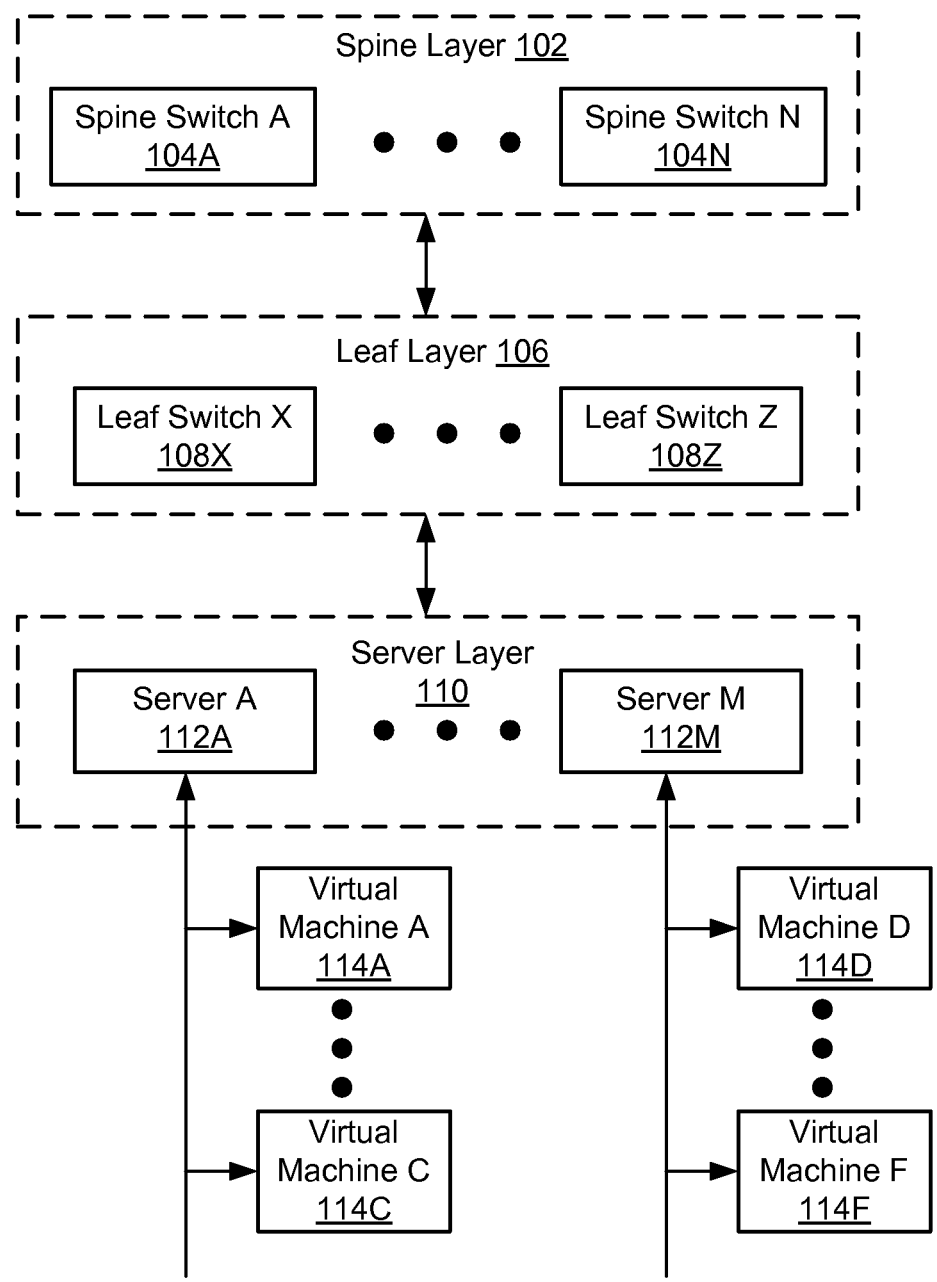
FIG. 1 shows a system in accordance with one or more embodiments of the invention.

FIG. 1 shows a system in accordance with one or more embodiments of the invention. In one or more embodiments of the invention, the system is a data center that includes a spine layer (102), a leaf layer (106), a server layer (110) and one or more virtual machines (114A-114F). The spine layer may include one or more spine switches (104A-104N), the leaf layer may include one or more leaf switches (108X-108Z), and the server layer may include one or more servers (112A-112M). One skilled in the art will recognize that the number of spine switches, leaf switches, servers, and virtual machines in a data center may vary depending on the requirements that the data center is designed to meet without departing from the invention.

In one or more embodiments of the invention, the server layer (110) includes one or more servers (112A-112M) that host zero or more virtual machines (114A-114F), the leaf layer (106) includes one or more leaf switches that connect to one or more servers in the server layer, and the spine layer (102) includes one or more spine switches that connect to one or more leaf switches in the leaf layer.

In one or more embodiments of the invention, a server (112A-112M) is a computer system. A computer system may include any type of system (e.g. software and computer hardware) that is configured to generate, send, receive, and/or process requests and replies either locally or over a network using software and computer hardware. The server may include a processor, memory, and one or more physical network interfaces. Examples of types of servers include, but are not limited to, web servers, DHCP servers, database servers, application servers, file servers, print servers, and mail servers. The computer system may also include functionality to execute one or more virtual machines, where each virtual machine may be configured to generate, send, receive, and/or process MAC frames. In one embodiment of the invention, each virtual machine corresponds to an execution environment that is distinct from the execution environment provided by the server upon which it is executing. Examples of virtual machine environments include, but are not limited to, Linux KVM, Oracle® VM and VMware® Virtual Server. (Linux is a registered trademark of Linus Torvalds, Oracle is a registered trademark of Oracle International Corporation and VMware is a registered trademark of VMware, Inc.).

In one or more embodiments of the invention, a switch (e.g., leaf switch and spine switch) is a physical device that includes persistent storage, memory (e.g., Random Access Memory), one or more processors (including a switch chip), and two or more physical ports. In one or more embodiments of the invention, the switch chip is hardware that determines which egress port on a switch to forward media access control (MAC) frames or a VXLAN frame (collectively referred to as "packets"). The switch chip may include egress and ingress ports that may connect to ports on the switch. Each port may or may not be connected to another device on a network (e.g., a server, a switch, a router, etc.). A switch may be configured to receive packets via the ports and determine whether to (i) drop the packet, (ii) process the packet in accordance with one or more embodiments of the invention (e.g., encapsulate the MAC frame as a VXLAN frame and prepare to send the VXLAN frame to a remote virtual tunnel end point, VTEP, via the network), and/or (iii) send the packet, based on the processing, out another port on the switch.

How the switch makes the determination of whether to drop the packet, encapsulate the packet, decapsulate the packet, and/or send the packet to another device on the network depends, in part, on whether the switch is a layer-2 (L2) switch or a layer-3 (L3) switch (also referred to as a multi-layer switch), which may perform at least some functions of a router. If the switch is operating as a L2 switch, the switch uses the destination MAC address along with a forwarding table to determine out of which port to send the packet. If the switch is operating as a L3 switch, the switch uses the destination IP address along with a routing table to determine out of which port to send the packet, and includes the ability to write the MAC address of the next device to receive the packet in place of its own MAC address (which the last device to send the packet wrote) in the L2 information encapsulating the packet. If the switch is a multi-layer switch, the multi-layer switch includes functionality to process packets using both MAC addresses and IP addresses. Further, encapsulation and decapsulation of the packets may be determined in accordance with the VXLAN frame format and/or other protocols and/or policies implemented by the switch.

Figure 3A:
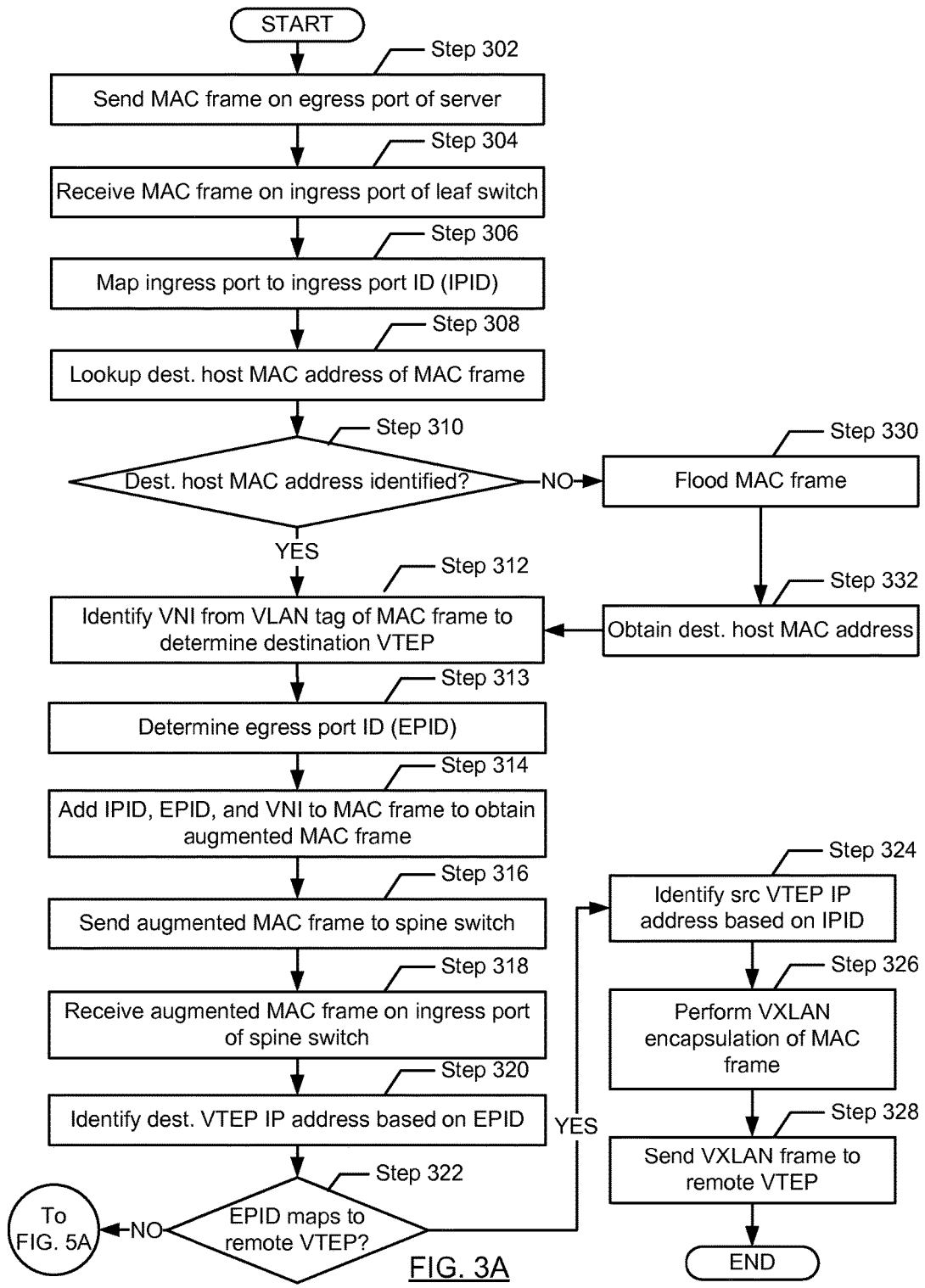
FIG. 3A shows a method for VXLAN encapsulation of a MAC frame in accordance with one or more embodiments of the invention.
Figure 3B:
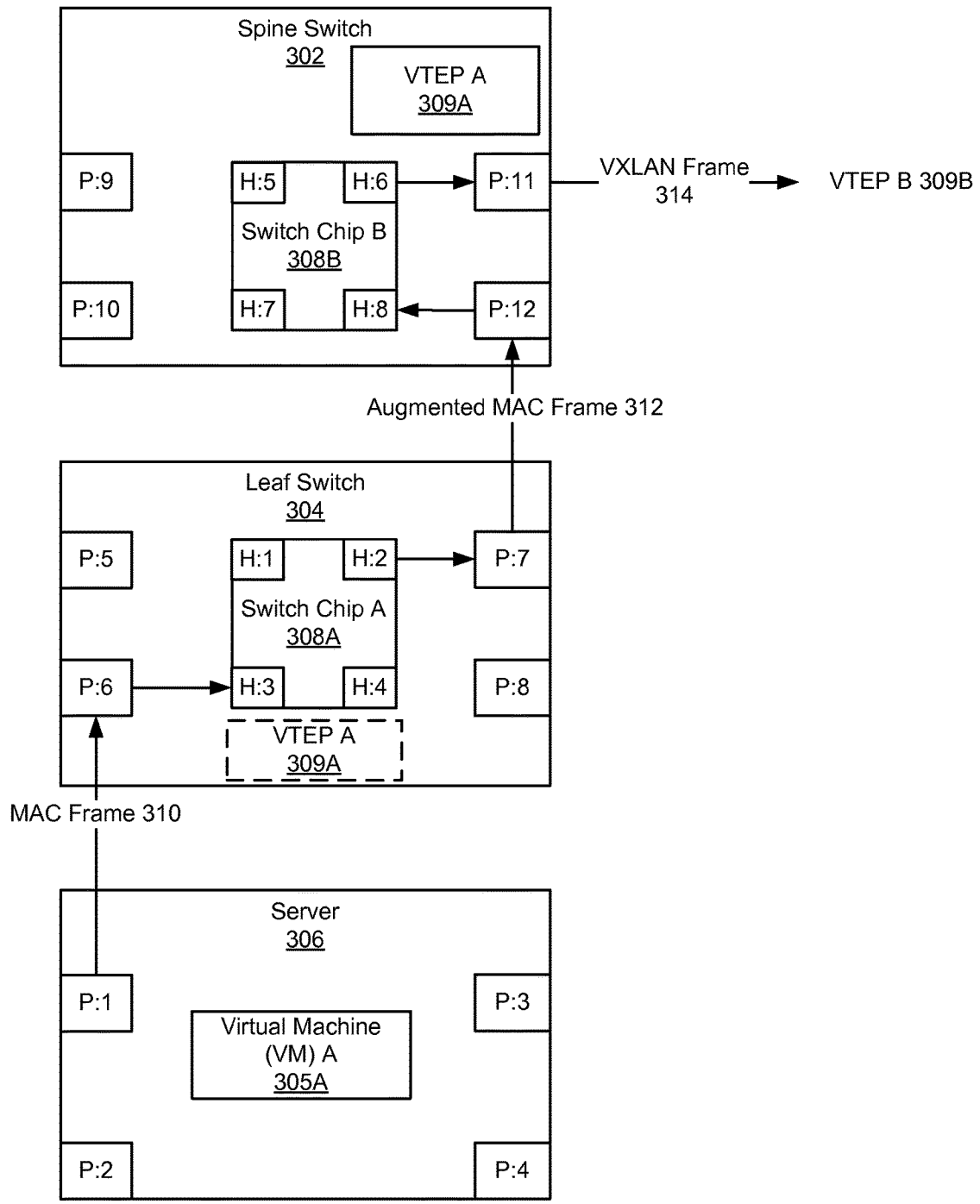
FIGS. 3B-3C show an example based on the method in FIG. 3A in accordance with one or more embodiments of the invention.

In addition, each spine switch may include functionality or be configured to execute one or more virtual tunnel end points (VTEPs) (see e.g., FIG. 3B). Each VTEP may be implemented as a combination of software and storage (volatile and/or persistent storage). Alternatively, each VTEP may be implemented as a combination of hardware and storage (volatile and/or persistent storage). In another alternative, each VTEP may be implemented as a combination of hardware and software. A VTEP includes functionality to generate VXLAN frames and process received VXLAN frames in accordance with the VXLAN frame format.

Figure 4A:
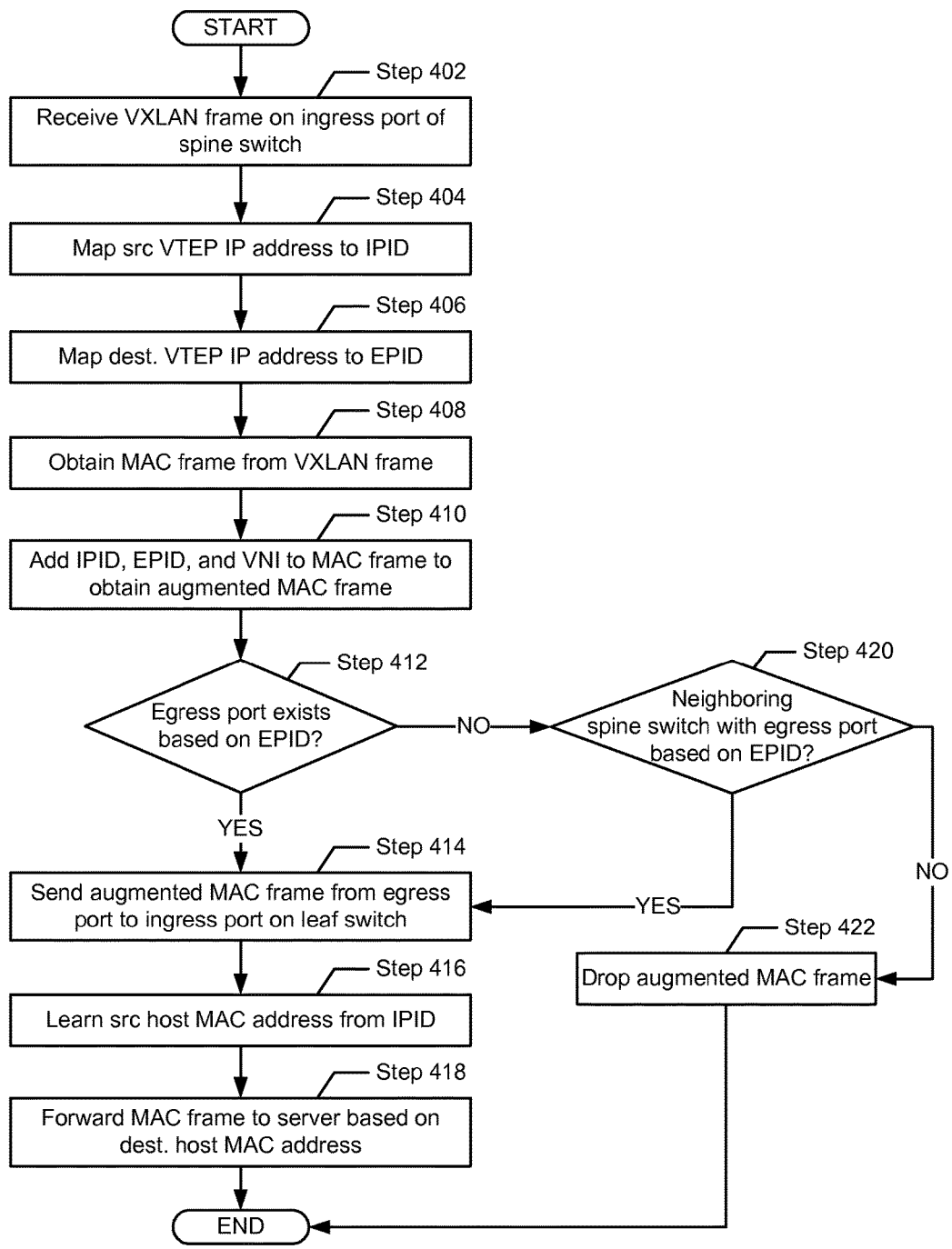
FIG. 4A shows a method for decapsulation of a VXLAN frame in accordance with one or more embodiments of the invention.
Figure 5A:
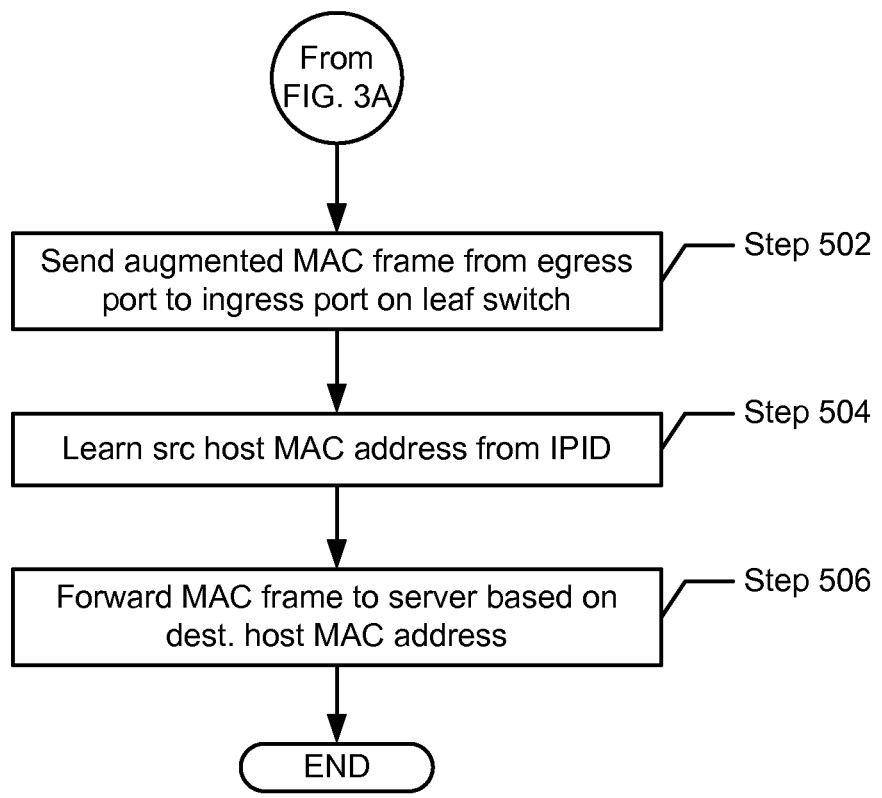
FIG. 5A shows a method for transmitting a MAC frame locally in accordance with one or more embodiments of the invention.

In one embodiment of the invention, the persistent storage in the switch may include any non-transitory computer readable medium that includes instructions, which, when executed by one or more processors in the switch, enable the switch to perform the functions described in accordance with one or more embodiments of the invention (see e.g., FIGS. 3A, 4A, 5A).

Although the system configuration shown in FIG. 1 includes a three-layer hierarchy (i.e., spine layer, leaf layer, and server layer), the system components may vary based on the particular needs of a given implementation of VXLAN offloading without departing from the invention. For example, there may be more or fewer tiers in the hierarchy of the network.

The invention is not limited to the system configuration shown in FIG. 1. Further, while the system in FIG. 1 is described as a datacenter, embodiments of the invention may be implemented using any system that includes at least one leaf switch and one spine switch.

Figure 2A:
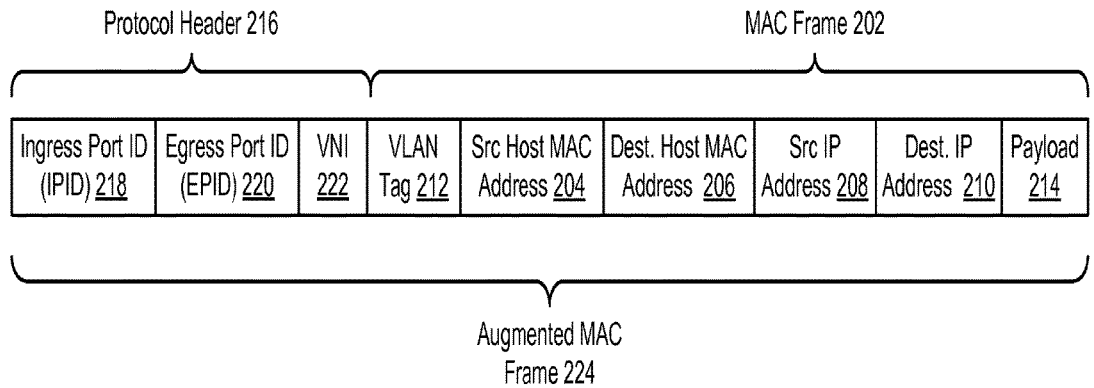
FIGS. 2A-2B show a MAC frame, an augmented MAC frame, and a VXLAN frame in accordance with one or more embodiments of the invention.
Figure 2B:
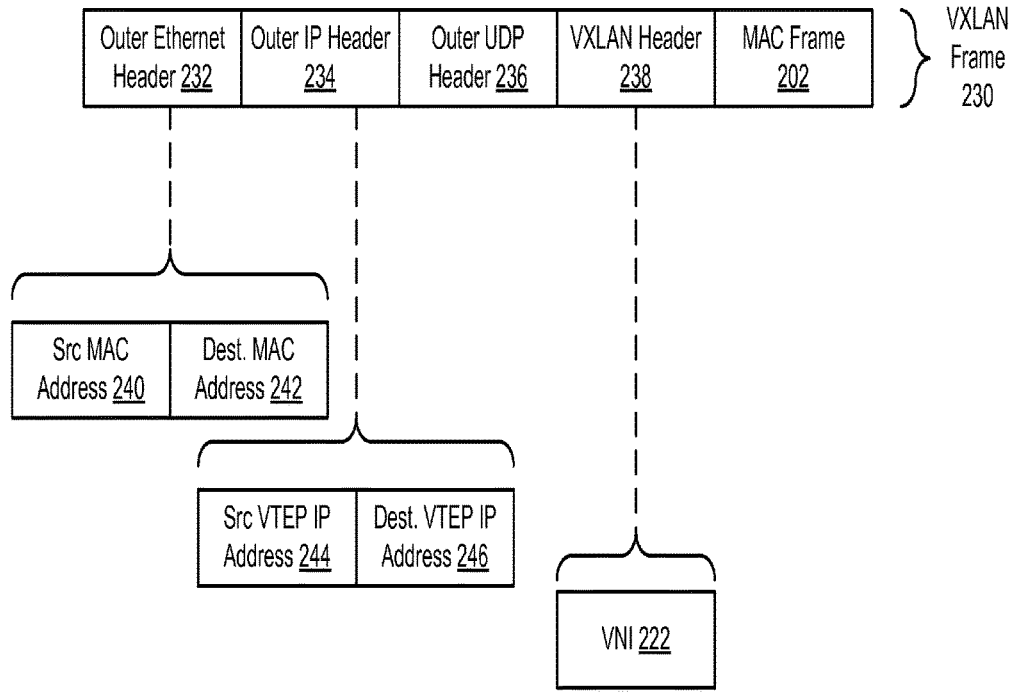

FIGS. 2A-2B show a media access control (MAC) frame (202), an augmented MAC frame (224), and a virtual extensible local area network (VXLAN) frame (230) in accordance with one or more embodiments of the invention. Each component is described below.

In one or more embodiments of the invention, the MAC frame (202) is generated by a network device (e.g., switch, server) or virtual machine (VM) executing on a network device. The MAC frame (202) includes (i) a virtual local area network (VLAN) tag (212), (ii) a source host MAC address (204), (iii) a destination host MAC address (206), (iv) a source IP address (208), (v) a destination IP address (210), and (vi) a payload (214). The VLAN tag (212) specifies the VLAN of the destination of the MAC frame. In one or more embodiments of the invention, a VLAN is a partition of network devices regardless of the location of the network devices, referred to as layer-2 isolation. In one or more embodiments of the invention, the VLAN tag (226) may or may not be included within the MAC frame. The VLAN tag is defined in accordance with IEEE 802.1Q. A source host MAC address (204) is the MAC address of the network device that generated the MAC frame. The destination host MAC address (206) is the MAC address of the network device (e.g., server, switch, etc.) or VM that is the destination of the MAC frame. A source IP address (208) is the IP address of the network device that generated the MAC frame. The destination IP address (210) is the IP address of the network device or VM that is the destination of the MAC frame. In one or more embodiments of the invention, the source IP address (208) and destination IP address (210) may or may not be included within the MAC frame. The payload (214) may include the content that the of the network device or VM is attempting to transmit to the destination network device or VM. The MAC frame (202) may include other information/content without departing from the invention.

In one or more embodiments of the invention, the augmented MAC frame (224) is the MAC frame (202) discussed above with additional metadata in a protocol header (216) that is prepended to the MAC frame. Said another way, the augmented MAC frame (224) includes: (i) a protocol header (216) and (ii) the MAC frame (202). The protocol header (216) includes: (i) an ingress port ID (IPID) (218), (ii) an egress port ID (EPID) (220), and (iii) a VXLAN network identifier (VNI) (222).

In one or more embodiments of the invention, an IPID (218) is a physical ingress port on a switch chip of a switch (hereinafter referred to as switch chip ingress port). In another embodiment of the invention, the IPID (218) may also be represented as a logical port that maps to the switch chip ingress port. For example, logical port 1000 may map to physical ingress port 1 on a switch chip of switch A. The IPID (218) has a one to one mapping to a source VTEP IP address. Said another way, for each source VTEP, there is a corresponding unique IPID. In one or more embodiments of the invention, a source VTEP is the VTEP that generates VXLAN frames (230) in accordance with the VXLAN frame format.

In one or more embodiments of the invention, an EPID (220) is a physical egress port on a switch chip of a switch (hereinafter referred to as switch chip egress port). In another embodiment of the invention, the EPID (220) may also be represented as a logical port that maps to the switch chip egress port. For example, logical port 600 may map to physical egress port 3 on a switch chip of switch B. The EPID (220) has a one to one mapping to a destination virtual tunnel endpoint (VTEP) IP address. Said another way, for each destination VTEP, there is a corresponding unique EPID. In one or more embodiments of the invention, a destination VTEP is the VTEP that processes (e.g., decapsulates) received VXLAN frames (230) in accordance with the VXLAN protocol. A destination VTEP may be a local VTEP if the destination VTEP and source VTEP are offloaded (e.g., both executing) on the same spine switch. Otherwise, the destination VTEP corresponds to a remote VTEP.

In one or more embodiments of the invention, a VNI (222) is a unique identifier of a VXLAN segment, where a VXLAN segment is a layer 2 overlay network over which VMs communicate. In one or more embodiments of the invention, only VMs within the same VXLAN segment (e.g., same VNI) may communicate with each other. In one or more embodiments of the invention, any VXLAN segment identifier may be used and the invention is not limited to the use of the VNI (222). In one embodiment of the invention, a layer 2 domain is defined as the set of virtual machines and/or servers (also referred to as hosts) that communicate using the same. The VNI scopes the MAC frame originated by the virtual machine (or host) such that the MAC frame may only be received by destinations (hosts or virtual machines) associated with the same VNI. The augmented MAC frame (224) may include other components without departing from the invention.

In one or more embodiments of the invention, the VXLAN frame (230) includes: (i) the MAC frame (202) (discussed above), (ii) a VXLAN header (238), (iii) an outer UDP header (236), (iv) an outer IP header (234), and (v) an outer Ethernet header (232). Each of the aforementioned components is described below.

In one or more embodiments of the invention, the VXLAN header (238) may include, but is not limited to, a VNI (222) (described above). The VXLAN header may include other information/content (e.g., other information/content that is described in the VXLAN frame format) without departing from the invention.

In one or more embodiments of the invention, the outer Ethernet header (232), the outer IP header (234) is used to route the VXLAN frame from the source VTEP to the destination VTEP. To this end, the outer Ethernet header (232) includes the source MAC address (240) and the next hop MAC address (242), and the outer IP header (234) includes the source VTEP IP address (244) and the destination VTEP IP address (246). The aforementioned components may include other information/content without departing from the invention.

The VXLAN frame (230) may include other components without departing from the invention.

The invention is not limited to the VXLAN frame, MAC frame or augmented MAC frame shown in FIGS. 2A-B. In one or more embodiments of the invention, Network Virtualization using Generic Routing Encapsulation (NVGRE) may be used in place of VXLAN.

FIG. 3A shows a method for encapsulation of a MAC frame in accordance with one or more embodiments of the invention. While the various steps in FIG. 3A are presented and described sequentially, one of ordinary skill will appreciate that some or all of the steps may be executed in different orders, may be combined or omitted, and some or all of the steps may be executed in parallel.

The method shown in FIG. 3A describes offloading VXLAN encapsulation to a spine switch to enable a source virtual machine (VM) to send a MAC frame to a destination VTEP to reach a destination VM, where the source VM is executing on a source server and the destination VM is executing on a destination server. From the perspective of the source VM, the source VM is not aware of the VXLAN protocol or of any routing mechanisms that use VXLAN; rather, the source VM operates as if it can send a MAC frame directly to the destination VM using conventional switching and routing mechanisms. In Step 302, a MAC frame is sent on an egress port of the source server executing the source VM towards the destination VM. In Step 304, the MAC frame sent in Step 302 is received on an ingress port of a leaf switch.

In Step 306, the ingress port of the leaf switch is mapped to an ingress port ID (IPID). In one or more embodiments of the invention, the IPID corresponds to switch chip ingress port of the leaf switch. In one or more embodiments of the invention, there is a one to one mapping between the ingress port of the leaf switch on which the MAC frame ingresses and the IPID.

In Step 308, a lookup of the destination host MAC address of the MAC frame is performed using a forwarding table of the leaf switch. In one or more embodiments of the invention, the destination host MAC address corresponds the MAC address of the destination VM accessible via the destination VTEP.

In Step 310, a determination is made about whether the destination host MAC address is identified. In one or more embodiments of the invention, the leaf switch knows the destination host MAC address (i.e. a corresponding entry in the forwarding table exists). In one or more embodiments, the switch learned the destination host MAC address from previously receiving a MAC frame from the destination VM. In one or more embodiments, the switch learned the destination host MAC address through static or dynamic configuration, possibly from an external controller. In one or more embodiments of the invention, the destination host MAC address is unknown to the leaf switch (i.e., a corresponding entry in the forwarding table does not exist). If a determination is made that the destination host MAC address is identified, the method may proceed to Step 312; otherwise the process proceeds to Step 330.

In Step 312, the VXLAN network identifier (VNI) is identified using the virtual local area network (VLAN) tag of the MAC frame. In one or more embodiments of the invention, the VLAN represented by the VLAN tag has a mapping to a VNI. For example, VLAN A and VLAN B may be members of VNI 1, whereas VLAN C may be a member of VNI 2. In one or more embodiments of the invention, a VNI may represent multiple VTEPs. Therefore, the VNI may identify a group of possible destination VTEPs in accordance with one or more embodiments of the invention. In this case, the destination host MAC address identified in Step 310 may then be used to identify the destination VTEP in the group of possible destination VTEPs to reach the destination VM. In one or more embodiments of the invention, a single VTEP is identified by the VNI. In this case, the single VTEP represents the destination VTEP through which the destination VM may be reached.

In Step 313, an egress port ID (EPID) is identified. In one or more embodiments of the invention, the EPID is a logical port when the destination VTEP is remote (see e.g., VTEP B 309B in FIG. 3B) and is a physical port on a switch chip in a leaf switch connected to the destination server when the VTEP is local (see e.g., VTEP B 509B in FIG. 5B). In one or more embodiments of the invention, an EPID is identified by the destination VTEP and destination host MAC address. There is a one to one mapping of the destination VTEP IP address of the destination VTEP to EPID. Said another way, an EPID may uniquely identifies a VTEP and vice versa.

In Step 314, the IPID, EPID, and VNI are combined with the MAC frame in order to obtain an augmented MAC frame. In one or more embodiments of the invention, the IPID, EPID, and VNI are part of the protocol header (see e.g., 216 in FIG. 2A) that is appended to the MAC frame to generate an augmented MAC frame. In one or more embodiments of the invention, the protocol header is added to the MAC frame by the switch chip of the leaf switch.

In Step 316, the augmented MAC frame is sent to a spine switch. In one or more embodiments of the invention, the augmented MAC frame is sent to any spine switch that connects to the leaf switch and is a next hop to the destination VM. In one or more embodiments of the invention, a spine switch executes the source VTEP offloaded by each leaf switch that connects to the spine switch. Those skilled in the art will appreciate that the spine switch may also be connected to leaf switches that including functionality to implement the VXLAN protocol.

Continuing with the discussion of FIG. 3, in Step 318, the augmented MAC frame sent in Step 316 is received on an ingress port of the spine switch. The ingress port of the spine switch connects to a switch chip ingress port on the spine switch.

In Step 320, the destination VTEP IP address is identified based on the EPID. In one or more embodiments of the invention, a switch chip of the spine switch may read the protocol header (see e.g., 216 in FIG. 2A) to obtain the EPID. As described above, a one to one mapping exists between the destination VTEP IP address of the destination VTEP and the EPID.

In Step 322, a determination is made about whether the EPID maps to a destination VTEP that is a remote VTEP. In one or more embodiments of the invention, the EPID maps to a remote VTEP if the spine switch does not also offload the destination VTEP. As described above, a spine switch offloads each VTEP of the leaf switches connected to the spine switch. Therefore, the EPID maps to a destination VTEP that is a local VTEP (i.e., not a remote VTEP) if the destination VTEP is also offloaded on the spine switch. If a determination is made that the EPID maps to a remote VTEP, the method may proceed to Step 324; otherwise, the process proceeds to step 502 in FIG. 5A In Step 324, the source VTEP IP address is identified based on the IPID. In one or more embodiments of the invention, a switch chip of the spine switch may read the protocol header (see e.g., 216 in FIG. 2A) to obtain the IPID. As described above, a one to one mapping exists between the source VTEP IP address of the source VTEP and the IPID.

In Step 326, VXLAN encapsulation of the MAC frame is performed in accordance with the VXLAN frame format. In one or more embodiments of the invention, the source VTEP encapsulates the MAC frame within a VXLAN frame (see e.g., FIG. 2B). More specifically, the VXLAN frame includes the following information: an outer Ethernet header that includes a MAC address of the spine switch (as the source MAC address) and a MAC address of the next hop towards the remote VTEP (as the destination MAC address), an outer IP header that includes the source VTEP IP address (as the source IP address) and the remote VTEP IP address (as the destination IP address), a UDP header, and a VXLAN header that includes the VNI (i.e., the VNI identified in Step 312 based on the VLAN tag of the MAC frame). The VXLAN frame may include additional information without departing from the invention.

In Step 328, the VXLAN frame is sent towards the remote VTEP. In one or more embodiments of the invention, the egress port of the spine switch that sends the VXLAN frame is selected as the egress port based on the destination VTEP IP address of the remote VTEP. Said another way, the VXLAN frame is routed towards the remote VTEP in accordance with standard IP routing mechanisms through the IP fabric to reach the switch (e.g. spine switch and leaf switch) that executes the remote VTEP.

Returning to Step 322, if a determination is made that the EPID does not map to a remote VTEP (i.e., local VTEP), the method may proceed to FIG. 5A (discussed below). As described above, the EPID maps to a local VTEP if the spine switch the offloads the source VTEP also offloads the destination VTEP.

Returning to Step 310, if a determination is made that the destination host MAC address is not identified, the method may proceed to Step 330. In Step 330, the MAC frame is flooded. In one or more embodiments of the invention, flooding the MAC frame involves forwarding the MAC frame on each port associated with the VLAN in the VLAN tag of the MAC frame. Additionally, a copy of the MAC frame is forwarded to each remote VTEP that participates in the VNI identified in Step 312. For example, a copy may be sent using a multicast or unicast (e.g., head end replication) method. The flooding in Step 330 may be performing using any known mechanism and/or protocol without departing from the invention.

In Step 332, the destination host MAC address is obtained based on the result of Step 330. In one or more embodiments of the invention, the destination host MAC address is only identified if a response is sent by the destination VM. In one or more embodiments of the invention, the destination host MAC address may be learned through an external system, such as a network controller.

Those skilled in the art will appreciate that embodiments of the invention may be implemented without virtual machines. In such scenarios, a network device may be configured to perform the steps that are described in being performed by the virtual machines in FIG. 3A. Further, embodiments of the invention may offload VXLAN encapsulation by offloading the source VTEP on any network device that is the next hop of a network device that receives a MAC frame to encapsulate, but is incapable of performing VXLAN encapsulation.

Figure 3C:
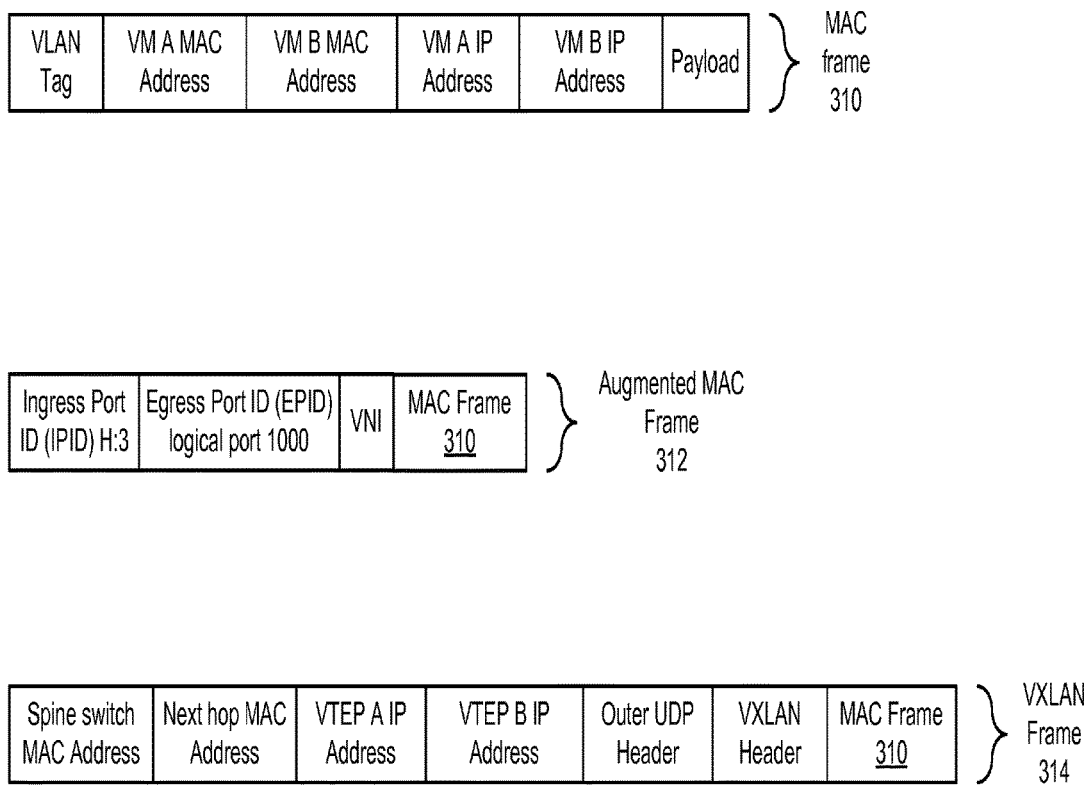

FIGS. 3B-3C show an example based on the method in FIG. 3A in accordance with one or more embodiments of the invention. The following example is for explanatory purposes only and not intended to limit the scope of the invention.

Turning to FIG. 3B-3C, consider a scenario in which a virtual machine (VM) A (305A) executing on server (306) wants to send a MAC frame to a VM B. VM A generates a MAC frame (310). The MAC frame (310) includes the following information (see FIG. 3C): a VLAN tag representing the VLAN with which VM B is associated, a MAC address of VM A, a MAC address of VM B, an IP address of VM A, an IP address of VM B, and the payload. The MAC frame (310) is sent to a leaf switch (304) using standard forwarding mechanisms. From the perspective of the server (306), the leaf switch (304) executes VTEP A (309A). However, in practice, VTEP A executes on a spine switch (302) connected to the leaf switch (304).

The MAC frame (310) is received by the leaf switch (304) on ingress port P:6. Ingress port P:6 is mapped to (i.e. connects to) ingress port H:3 on switch chip A (308A). Ingress port H: 3 represents the IPID. There is a one to one mapping between the IPID and VTEP A (309A) (i.e., source VTEP).

The VNI is identified based on the VLAN represented by the VLAN tag in the MAC frame (310). The MAC address of VM B (i.e., destination MAC address) and the VNI are used to identify the destination VTEP and the corresponding destination VTEP IP address. The destination VTEP IP address is used to determine the EPID, which in this example is logical port 1000.

Switch chip A (308A) appends the IPID (i.e., ingress port H: 3), the EPID (i.e., logical port 1000), and the VNI as a protocol header to the MAC frame (310) to obtain an augmented MAC frame (312) (see FIG. 3C). The augmented MAC frame is forwarded from port H:2 on the switch chip A (308A), via egress port P:7 on leaf switch (304), to ingress port P:12 on a spine switch (302). In one or more embodiments of the invention, any egress port on the leaf switch (304) that connects to an ingress port on the spine switch (302) may be used.

The spine switch receives the augmented MAC frame (312) from the leaf switch and subsequently processes it in accordance with the method shown in FIG. 3A. Specifically, VTEP A (309A) encapsulates the MAC frame (310) from the augmented MAC frame (312) into a VXLAN frame (314) that includes the following information (see FIG. 3C): MAC address of spine switch (302), MAC address of the next hop to reach VTEP B, IP address of VTEP A, IP address of VTEP B, the outer UDP header, the VXLAN header that includes the VNI, and the MAC frame (310). The IP address of VTEP A is determined using the IPID of the augmented MAC frame (312), the IP address of VTEP B is determined using the EPID of the augmented MAC frame, and the VNI is directly obtained from the augmented MAC frame. The egress port P:11 on the spine switch (302) is selected as the egress port on the spine switch based on the destination VTEP IP address of the remote VTEP. The VXLAN frame (314) is subsequently sent towards the remote VTEP (309B).

FIG. 4A shows a method for decapsulation of a VXLAN frame in accordance with one or more embodiments of the invention. While the various steps in FIG. 4A are presented and described sequentially, one of ordinary skill will appreciate that some or all of the steps may be executed in different orders, may be combined or omitted, and some or all of the steps may be executed in parallel.

The method shown in FIG. 4A describes offloading VXLAN decapsulation of a VXLAN frame on a spine switch. In Step 402, a VXLAN frame is received on an ingress port of a spine switch.

In Step 404, a source VTEP IP address in the VXLAN frame is mapped to an ingress port ID (IPID). In one or more embodiments of the invention, the IPID is a logical port. There is a one to one mapping between the source VTEP IP address associated with the source VTEP and the IPID.

In Step 406, a destination VTEP IP address is mapped to an egress port ID (EPID). More specifically, the EPID corresponding to the destination VTEP IP address is obtained using the destination VTEP IP address. In one or more embodiments of the invention, the EPID is a logical port. There is a one to one mapping between the destination VTEP IP address associated with the destination VTEP and the EPID.

In Step 408, a MAC frame is obtained from the VXLAN frame. In one or more embodiments of the invention, the destination VTEP IP address matches a destination VTEP that is offloaded on the spine switch. Therefore, the spine switch performs VXLAN decapsulation of the VXLAN frame to obtain the MAC frame in accordance with the VXLAN frame format.

In Step 410, the IPID identified in Step 404, the EPID identified in Step 406, and the VNI from the VXLAN header are added to the MAC frame to obtain an augmented MAC frame. In one or more embodiments of the invention, the IPID, EPID, and VNI are part of the protocol header (see e.g., 216 in FIG. 2A) that is appended to the MAC frame to generate an augmented MAC frame.

In Step 412, a determination is made about whether an egress port exists based on the EPID. In one or more embodiments of the invention, it is possible that the spine switch that receives the VXLAN frame does not include an egress port that links to a leaf switch that connects to the destination server executing the destination VM. If a determination is made that an egress port exists based on the EPID, the method may proceed to Step 414. In Step 414, an augmented MAC frame is sent from the egress port to an ingress port on a leaf switch.

In Step 416, the leaf switch learns the source host MAC address is associated with the IPID. In one or more embodiments of the invention, the IPID represents the source VTEP. The leaf switch may also learn that the source host MAC address is associated with the source VTEP.

In Step 418, the MAC frame is forwarded to the destination server based on the destination host MAC address in the MAC frame. In one or more embodiments of the invention, the EHPI is a logical port that may be mapped to a switch chip egress port of the leaf switch. The switch chip egress port is mapped to (i.e., connects to) an egress port on the leaf switch that connects to the destination server executing the destination VM.

Returning to Step 412, if a determination is made that an egress port does not exist based on the EPID, the method may proceed to Step 420. In Step 420, a determination is made about whether there is a neighboring spine switch with an egress port based on the EPID. If a determination is made that there is a neighboring spine switch with an egress port based on the EPID, then the augmented MAC frame may be sent to the neighboring spine, which then proceeds to perform Step 414 described above. In one or more embodiments of the invention, a neighboring spine switch is a switch that is directly connected to the spine switch in the spine layer.

If a determination is made that there is not a neighboring spine switch with an egress port based on the EPID, the method may proceed to Step 422. In Step 422, the augmented MAC frame is dropped. Said another way, the augmented MAC frame does not reach the destination VM.

Those skilled in the art will appreciate that embodiments of the invention may be implemented without virtual machines. In such scenarios, a network device may be configured to perform the steps that are described in being performed by the virtual machines in FIG. 4A. Further, embodiments of the invention may offload VXLAN decapsulation by executing the destination VTEP on any network device whose next hop is a network device incapable of performing VXLAN decapsulation, but connects to the destination server or destination VM.

Figure 4B:
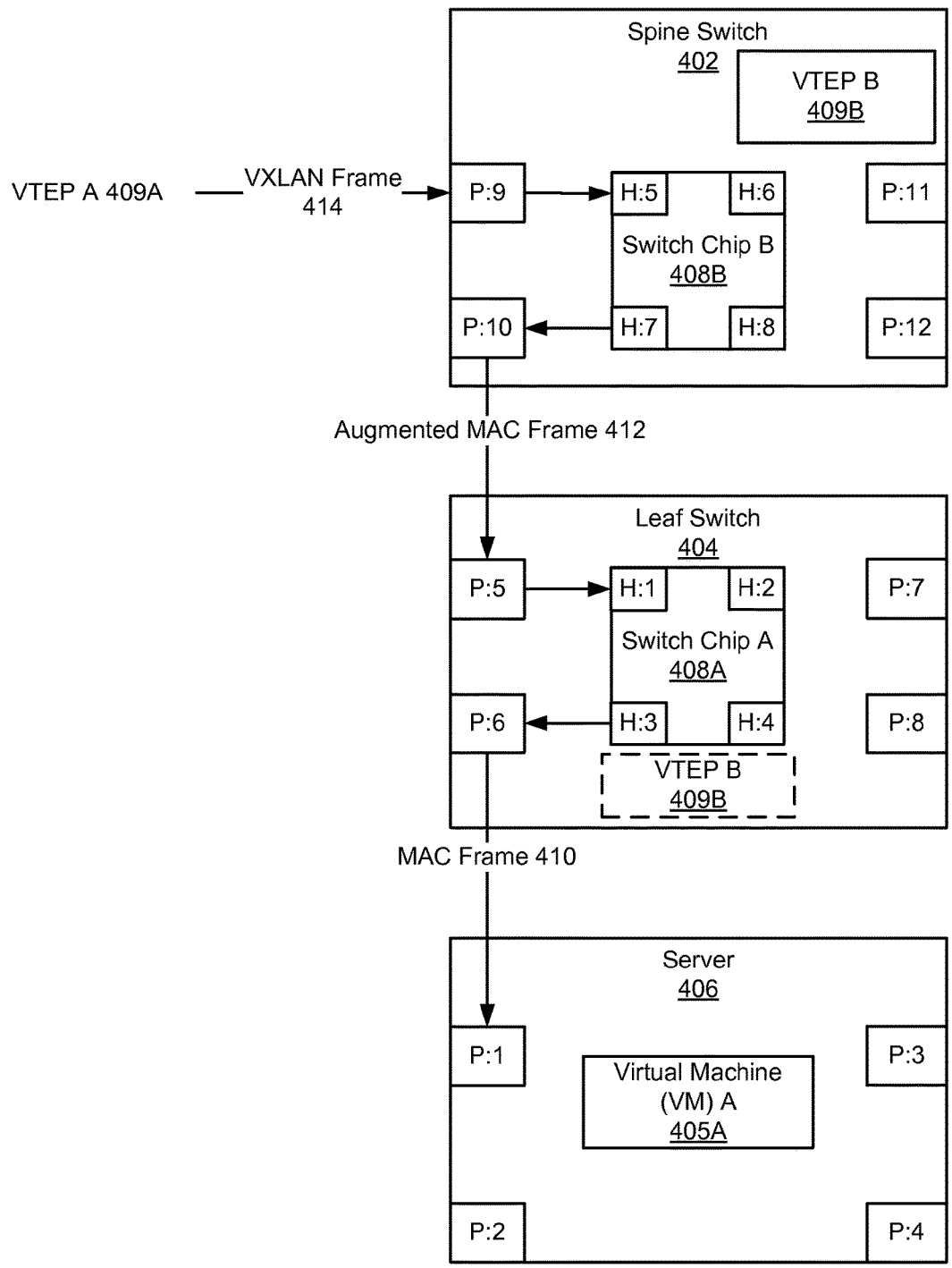
FIGS. 4B-4C show an example based on the method in FIG. 4A in accordance with one or more embodiments of the invention.
Figure 4C:
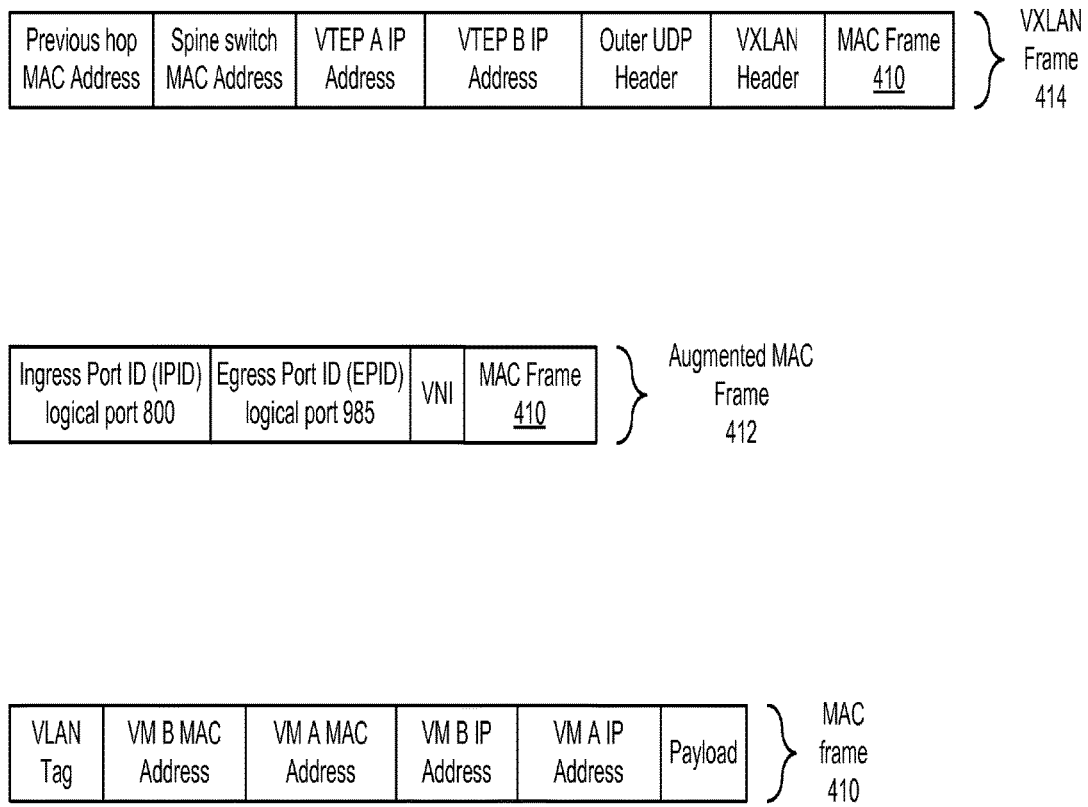

FIGS. 4B-4C show an example based on the method in FIG. 4A in accordance with one or more embodiments of the invention. The following example is for explanatory purposes only and not intended to limit the scope of the invention.

Turning to FIG. 4B-4C, consider a scenario in which a spine switch (402) receives a VXLAN frame (414) from a VTEP A (409A) (i.e. source VTEP). The VXLAN frame (414) includes the following information (see FIG. 4C): a MAC address of the previous hop, a MAC address of the spine switch (402), a source IP address of VTEP A, a destination IP address of VTEP B, the outer UDP header, a VXLAN header that includes the VNI, and the MAC frame (410). The IP address of VTEP A is used to identify the IPID, where the IPID corresponds to logical port 800. The IP address of VTEP B is used to identify the EPID, where the EPID corresponds to logical port 985.

As shown in FIG. 4B, VTEP B (409B) is executing on the spine switch (402) and, in this example, decapsulates the VXLAN frame (414) to obtain the MAC frame (410). In one or more embodiments of the invention, decapsulation occurs as the destination VTEP IP address in the outer IP header in the VXLAN frame matches the IP address of VTEP B (409B). The MAC frame (410) includes the following information (see FIG. 4C): a VLAN tag representing with which VM B is associated, MAC address of VM B, MAC address of VM A, IP address of VM B, the IP address of VM A, and the payload.

Switch chip B (408B) augments the MAC frame (410) to obtain an augmented MAC frame (412). The augmented MAC frame (414) includes the following information (see FIG. 4C): the IPID (i.e., logical port 800), EPID (i.e., logical port 985), the VNI, and the MAC frame. Logical port 985 (i.e., the EPID in the augmented MAC frame) is used to determine that the augmented frame is to be forward out of egress port P:10 on the spine switch (402). The augmented MAC frame (412) is sent from egress port P:10 on the spine switch (402) to ingress port P:5 on a leaf switch (404).

Upon receipt of the augmented MAC frame (401), switch chip A (408A) learns the IPID of VTEP A from the augmented MAC frame (412). The MAC address of VM B (i.e., source host MAC address) in the MAC frame (410) is then associated with VTEP A. In one or more embodiments of the invention, this information may then be used by the leaf switch for future communication to VM B.

The leaf switch (404) then forwards the MAC frame (410) to a server (406) that executes VM A (405A) based on the destination host MAC address in the MAC frame, and the VLAN mapped to the VNI in the augmented MAC frame (412).

FIG. 5A shows a continuation of the method in FIG. 3A (discussed above) for transmitting a MAC frame locally in accordance with one or more embodiments of the invention. While the various steps in FIG. 5A are presented and described sequentially, one of ordinary skill will appreciate that some or all of the steps may be executed in different orders, may be combined or omitted, and some or all of the steps may be executed in parallel.

The method shown in FIG. 5A describes offloading processing by a VTEP to enable a source virtual machine (VM) to send a MAC frame to a local VTEP to reach a destination VM, where the source VM is executing on a source server and the destination VM is executing on a destination server. In one or more embodiments of the invention, a local VTEP does not require VXLAN encapsulation. A local VTEP is a destination VTEP that is offloaded on the same switch as the source VTEP.

In Step 502, an augmented MAC frame is sent from an egress port on a spine switch to an ingress port on a leaf switch connected to the destination server executing the destination VM. In one or more embodiments of the invention, the egress port is selected based on the destination VTEP IP address represented by the EPID in the augmented MAC frame.

In Step 504, a source host MAC address is associated with the IPID in the augmented MAC frame. More specifically, the leaf switch learns that the source host MAC address is associated with the source VTEP for any future communication from the destination VM to the source VM.

In Step 506, a MAC frame is forwarded to a destination server based on a EPID in the augmented MAC frame. In one or more embodiments of the invention, the EPID in the augmented MAC frame is a logical port that is mapped to a switch chip egress port of the leaf switch. The switch chip egress port is mapped to (i.e., connects to) an egress port on the leaf switch that connects to the destination server executing the destination VM.

Those skilled in the art will appreciate that embodiments of the invention may be implemented without virtual machines. In such scenarios, a network device may be configured to perform the steps that are described in being performed by the virtual machines in FIG. 5A. Further, embodiments of the invention may transmit augmented MAC frames locally by executing the source VTEP and destination VTEP on any network device that is the next hop of a network device that receives the augmented MAC frame.

Figure 5B:
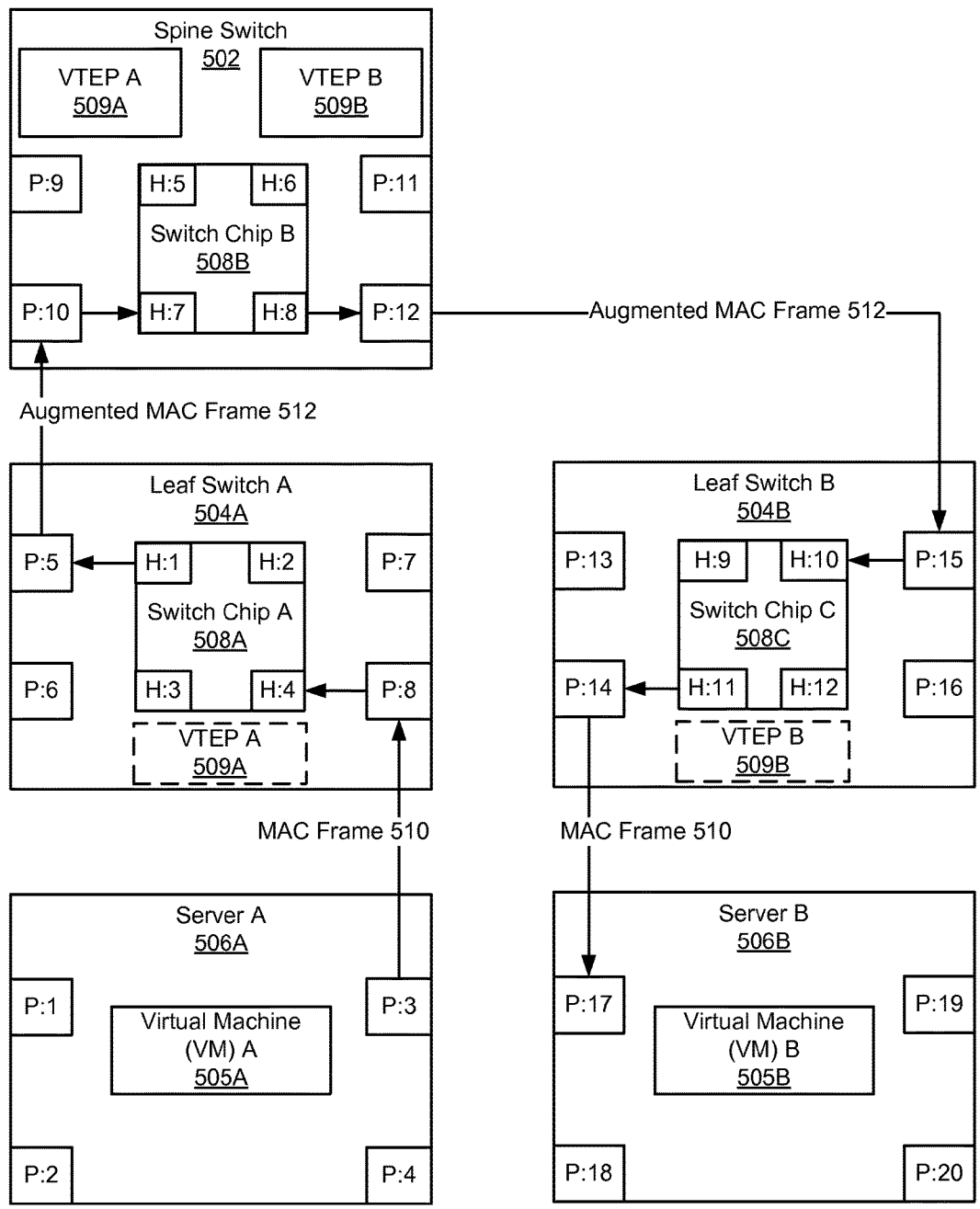
FIGS. 5B-5C show an example based on the method in FIG. 5A in accordance with one or more embodiments of the invention.
Figure 5C:
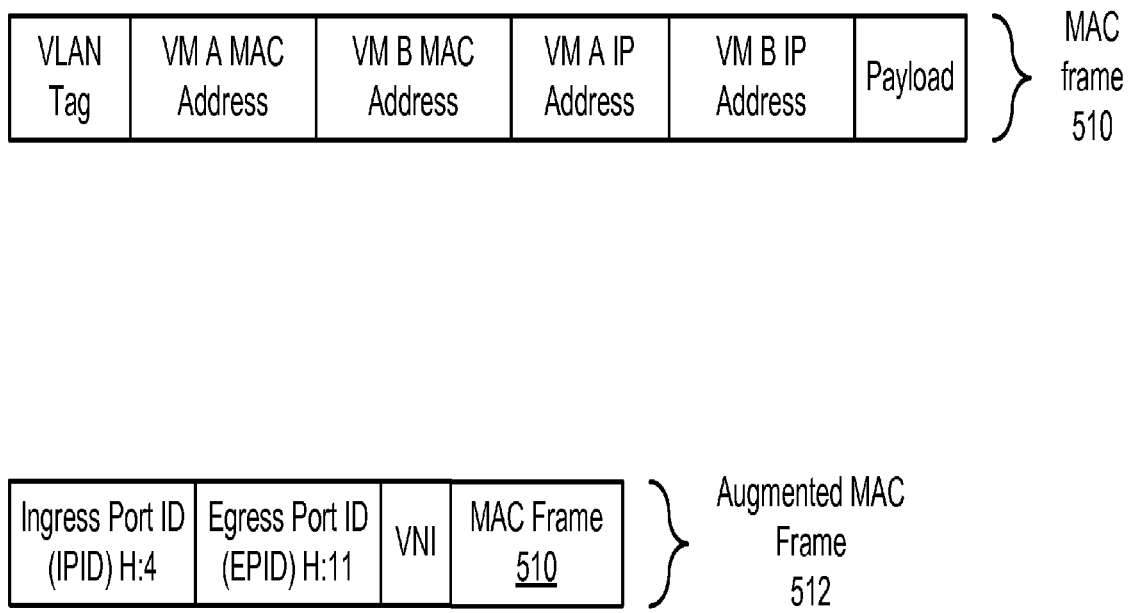

FIGS. 5B-5C show an example based on the method in FIG. 5A in accordance with one or more embodiments of the invention. The following example is for explanatory purposes only and not intended to limit the scope of the invention.

Turning to FIG. 5B-5C, consider a scenario in which a virtual machine (VM) A (505A) executing on server A (506) wants to send a MAC frame (510) to a VM B (505B). VM A (505A) generates a MAC frame (510). The MAC frame (510) includes the following information (see FIG. 5C): a VLAN tag representing the VLAN with which VM B is associated, a MAC address of VM A, a MAC address of VM B, an IP address of VM A, an IP address of VM B, and a payload. The MAC frame (510) is sent to leaf switch A (504A) using standard MAC frame forwarding mechanisms. From the perspective of server A (506A), leaf switch A (504A) executes VTEP A (509A). However, in practice, VTEP A (509A) executes on a spine switch (502) connected to leaf switch A (504A).

The MAC frame (510) is received by leaf switch A (504A) on ingress port P:8. Ingress port P8 is mapped to (i.e. connects to) ingress port H:4 on switch chip A (508A). Ingress port H:4 represents the IPID. There is a one to one mapping between the IPID and VTEP A (509A) (i.e., source VTEP).

The VNI is identified based on the VLAN represented by the VLAN tag in the MAC frame (510). The MAC address of VM B (i.e., destination MAC address) and the VNI are used to identify VTEP B (509B) as the destination VTEP. Egress port H:11 represents the EPID.

Switch chip A (508A) appends the IPID (i.e., ingress port H:4), the EPID (i.e., egress port H:11), and the VNI as a protocol header to the MAC frame (510) to obtain an augmented MAC frame (512) (see FIG. 5C). The augmented MAC frame (512) is forwarded from port H:1 on the switch chip A (508A), via egress port P:5 on leaf switch A (504A), to ingress port P:10 on the spine switch (502). In one or more embodiments of the invention, any egress port on leaf switch A (504A) that is connected to an ingress port on the spine switch (502) may be used.

Turning to spine switch (502), VTEP B (509B) is offloaded on the spine switch (502) (i.e., destination VTEP). In one or more embodiments of the invention, because the spine switch offloads VTEP A (509A) (i.e., source VTEP) and VTEP B (509B) (i.e., destination VTEP), the destination VM is local. Said another way, VXLAN encapsulation by the spine switch (502) is not required because VXLAN decapsulation would occur by the same spine switch immediately following the VXLAN encapsulation. The egress port P:12 on the spine switch (502) is selected to forward the augmented MAC frame as it is known through standard forwarding mechanisms that port P:12 reaches leaf switch B (504B).

Switch chip C (508C) learns the IPID in the augmented MAC frame (512). The MAC address of VM A (i.e., source host MAC address) in the augmented MAC frame (512) is then associated with the IPID. In one or more embodiments of the invention, the MAC address of VM A that it is associated with the IPID is now known on leaf switch B (504B) for future communication to VM A.

Leaf switch B (504B) then forwards the MAC frame (510) to server B (506B) that executes VM B (505B) based on the EPID in the augmented MAC frame. In one or more embodiments of the invention, leaf switch B (504B) uses the destination MAC address and VLAN number in the MAC frame (510) to determine the egress port on the leaf switch through which the forward the packet to the leaf switch. Alternatively, the EPID in the augmented MAC frame may be used to determine the egress port on the leaf switch. The MAC frame (510) is subsequently forwarded to VM B (505B) on server B (506B).

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

One or more embodiments of the invention enable offloading of VXLAN encapsulation and decapsulation from a network device in one layer (e.g., leaf switch in the leaf layer) to a more capable network device one layer above or that is the next hop to the destination (e.g., spine switch in spine layer). In one or more embodiments of the invention, the more capable network device has a specialized chip or sufficient processing capabilities along with the corresponding software instructions to perform VXLAN encapsulation and decapsulation. Further, one or more embodiments of the invention enable communication of how the MAC frame should be encapsulated to the more capable device via an augmented MAC frame.

Those skilled in the art will appreciate that while the above invention has been described with respect to the VXLAN protocol, embodiments of the invention may be implemented using other encapsulation protocols, e.g., such as Network Virtualization using Generic Routing Encapsulation (NVGRE). In such scenarios in which NVGRE is implemented in place of VXLAN, all references to VTEPs in the aforementioned description may be replaced with NVGRE endpoints and all references to VNI may be replaced with references to VSID. Said another way, the use of NVGRE Endpoints to implement NVGRE protocol embodiments of the invention is the same as the use of VTEP as described above in the VXLAN protocol embodiments. Further, the use of VSIDs to implement NVGRE protocol embodiments of the invention is the same as the use of VNIs as described above in the VXLAN protocol embodiments. All other aspects of the invention remain unchanged when implemented using the VXLAN protocol or NVGRE protocol.

One version of the NVGRE protocol is defined in the document entitled "NVGRE: Network Virtualization using Generic Routing Encapsulation" version 04 dated February 2014. The NVGRE protocol is hereby incorporated by reference in its entirety. The invention is not limited to a particular version of NVGRE.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for virtual extensible local area network (VXLAN) decapsulation, comprising:
    receiving a VXLAN frame on a first ingress port of a first network device, wherein the VXLAN frame comprises a source VXLAN tunnel endpoint (VTEP) internet protocol (IP) address, a destination VTEP IP address, a VXLAN network identifier (VNI), and a media access control (MAC) frame;
    identifying an egress port ID (EPID) based on the destination VTEP IP address, wherein the destination VTEP IP address is associated with a destination VTEP;
    determining that the destination VTEP is located on the first network device;
    identifying an ingress port ID (IPID) based on the source VTEP IP address, wherein the source VTEP IP address is associated with a source VTEP;
    generating an augmented MAC frame, wherein the augmented MAC frame comprises the IPID, the EPID, the VNI, and the MAC frame, and wherein the MAC frame comprises a destination host MAC address;
    identifying an egress port on the first network device based on the EPID; and
    sending the augmented MAC frame to a second network device via the egress port on the first network device.

2. The method of claim 1, further comprising:
    receiving the augmented MAC frame on a second ingress port of the second network device, wherein the second ingress port connects to the egress port on the first network device;
    learning a source host MAC address based on the IPID; and
    forwarding the MAC frame to a third network device based on at least one selected from a group consisting of the EPID and, a destination host MAC address and a virtual local area network (VLAN) number.

3. The method of claim 1, wherein the IPID is a logical port on a third network device, and wherein the IPID has a one to one mapping to the source VTEP.

4. The method of claim 3, wherein the source VTEP is located on a fourth network device that connects to the third network device and sends the VXLAN frame to the first network device.

5. The system of claim 1, wherein the first EPID is a logical port, and wherein the first EPID has a one to one mapping to the first destination VTEP IP address.

6. The method of claim 1, wherein the first network device and the second network device are each one selected from a group consisting of a switch, a router, and a multilayer switch.

7. A system for virtual extensible local area network (VXLAN) decapsulation, comprising:
    a first network device, comprising a first processor, and configured to:
        receive a VXLAN frame on a first ingress port of the first network device, wherein the VXLAN frame comprises a source VXLAN tunnel endpoint (VTEP) internet protocol (IP) address, a first destination VTEP IP address, a first VXLAN network identifier (VNI), and a first media access control (MAC) frame;
        identify a first ingress port ID (IPID) based on the source VTEP IP address;
        identify a first egress port ID (EPID) based on the first destination VTEP IP address, wherein the first destination VTEP IP address is associated with a first destination VTEP;
        determine that the first destination VTEP is located on the first network device;
        generate a first augmented MAC frame, wherein the first augmented MAC frame comprises the first IPID, the first EPID, the first VNI, and the first MAC frame;
        identify a first egress port on the first network device based on the first EPID; and
        send the first augmented MAC frame to a second network device via the first egress port on the first network device; and the second network device, comprising a second processor and operatively connected to the first network device, and configured to:
 receive the first augmented MAC frame on a second ingress port of the second network device, wherein the second ingress port connects to the egress port on the first network device, and wherein the first MAC frame in the first augmented MAC frame comprises, a source host MAC address and a first destination host MAC address;
 learn the source host MAC address based on the first IPID; and
 forward the first MAC frame to a third network device based on the first destination host MAC address.

8. The system of claim 7, wherein the second network device is further configured to:
 after learning the source host MAC address:
  receive a second MAC frame on a third ingress port of the second network device, wherein the second MAC frame comprises a second destination host MAC address and a virtual local area network (VLAN) tag;
  determine a second IPID based on a switch chip ingress port connected to the third ingress port;
  identify a second VNI based on the VLAN tag;
  identify a second destination VTEP based on the second VNI and the second destination host MAC address, wherein the second destination host MAC address is the same as the source host MAC address;
  determine a second EPID based on the second destination VTEP;
  generate a second augmented MAC frame, wherein the second augmented MAC frame comprises the second IPID, the second EPID, the second VNI, and the second MAC frame; and
  send the second augmented MAC frame to the first network device via a second egress port of the second network device.

9. The system of claim 7, wherein the first EPID is a logical port, and wherein the first EPID has a one to one mapping to the first destination VTEP IP address.

10. The system of claim 7, wherein the first IPID is a logical port on a third network device, and wherein the IPID has a one to one mapping to the source VTEP IP address.

11. The system of claim 10, wherein the source VTEP IP address is associated with a source VTEP located on a fourth network device that connects to the third network device and sends the VXLAN frame to the first network device.

12. The system of claim 7, wherein the first network device and the second network device are each one selected from a group consisting of a switch, a router, and a multilayer switch.

13. A non-transitory computer readable medium (CRM) comprising instructions, which when executed by a processor, performs a method for virtual extensible local area network (VXLAN) decapsulation, the method comprising:
 receiving a VXLAN frame on a first ingress port of a first network device, wherein the VXLAN frame comprises a source VXLAN tunnel endpoint (VTEP) internet protocol (IP) address, a destination VTEP IP address, a VXLAN network identifier (VNI), and a media access control (MAC) frame;
 identifying an egress port ID (EPID) based on the destination VTEP IP address, wherein the destination VTEP IP address is associated with a destination VTEP;
 determining that the destination VTEP is located on the first network device;
 identifying an ingress port ID (IPID) based on the source VTEP IP address, wherein the source VTEP IP address is associated with a source VTEP;
 generating an augmented MAC frame, wherein the augmented MAC frame comprises the IPID, the EPID, the VNI, and the MAC frame, and wherein the MAC frame comprises a destination host MAC address;
 identifying an egress port on the first network device based on the EPID; and
 sending the augmented MAC frame to a second network device via the egress port on the first network device.

14. The non-transitory CRM of claim 13, wherein the method further comprises:
 receiving the augmented MAC frame on a second ingress port of the second network device, wherein the second ingress port connects to the egress port on the first network device;
 learning a source host MAC address based on the IPID; and
 forwarding the MAC frame to a third network device based on at least one selected from a group consisting of the EPID and, a destination host MAC address and a virtual local area network (VLAN) number.

15. The non-transitory CRM of claim 13, wherein the first network device and the second network device are each one selected from a group consisting of a switch, a router, and a multilayer switch.

16. The non-transitory CRM of claim 13, wherein the IPID is a logical port on a third network device, and wherein the IPID has a one to one mapping to the source VTEP.

17. The non-transitory CRM of claim 16, wherein the source VTEP is located on a fourth network device that connects to the third network device and sends the VXLAN frame to the first network device.

18. The non-transitory CRM of claim 13, wherein the first EPID is a logical port, and wherein the first EPID has a one to one mapping to the first destination VTEP IP address.

* * * * *